United States Patent
Goldman

(12) United States Patent (10) Patent No.: US 8,588,583 B2
Goldman (45) Date of Patent: Nov. 19, 2013

(54) SYSTEMS AND METHODS FOR INTERACTIVE VIDEO FRAME SELECTION

(75) Inventor: Daniel Goldman, Seattle, WA (US)

(73) Assignee: Adobe Systems Incorporated, San Jose, CA (US)

(\*) Notice: Subject to any disclaimer, the term of this patent is extended or adjusted under 35 U.S.C. 154(b) by 1607 days.

(21) Appl. No.: 11/843,338

(22) Filed: Aug. 22, 2007

(65) Prior Publication Data

US 2009/0052861 A1 Feb. 26, 2009

(51) Int. Cl.
*H04N 9/80* (2006.01)

(52) U.S. Cl.
USPC .......................................................... 386/241

(58) Field of Classification Search
None
See application file for complete search history.

(56) References Cited

U.S. PATENT DOCUMENTS

| | | | | |
|---|---|---|---|---|
| 5,515,377 | A * | 5/1996 | Horne et al. | 370/395.64 |
| 5,877,969 | A * | 3/1999 | Gerber | 705/13 |
| 6,690,294 | B1 * | 2/2004 | Zierden | 340/937 |
| 2005/0212927 | A1 * | 9/2005 | Hamamura et al. | 348/222.1 |
| 2008/0170650 | A1 * | 7/2008 | Theil | 375/360 |

FOREIGN PATENT DOCUMENTS

| | | |
|---|---|---|
| JP | 5108730 A | 4/1993 |
| JP | 4352076 A | 12/1993 |
| JP | 2000285253 A | 10/2000 |

OTHER PUBLICATIONS

Kimber, D. et al., "Trailblazing: Video Playback Control by Direct Object Manipulation," ICME 2007, pp. 1015-1018, 2007.

Everingham et al., ""Hello! My name is . . . Buffy"—Automatic Naming of Characters in TV Video", British Machine Vision Conference, 2006.

Goldman et al., "Interactive Video Object Annotation", Technical Report UW-CSE-2007-04-01, 2007.

Russell et al., "Using Multiple Segmentations to Discover Objects and their Extent in Image Collections", IEEE Conference on Computer Vision and Pattern Recognition (CVPR), 2006.

Sivic et al., "Discovering object Categories in Image Collections", In: Proceedings of the Tenth International Conference on Computer Vision, 2005.

Sivic et al., "Discovering Objects and their Locations in Images", Computer Vision, 2005 ICCV Tenth IEEE International Conference, 2005.

Sivic et al., "Efficient Object Retrieval from Videos", EUSIPCO 2004—European Signal Processing Conference, 2004.

Sivic et al., "Finding People in Repeated Shots of the Same Scene", BMVC, vol. 3, 2006, 909-918.

Sink et al., "Object Level Grouping for Video Shots", Robotics Research Group, Department of Engineering Science, 2004.

Sivic et al., "Person Spotting: Video Shot Retrieval for Face Sets", International Conference on Image and Video Retrieval (CIVR 2005), 2005, 226-236.

(Continued)

*Primary Examiner* — Huy T Nguyen
(74) *Attorney, Agent, or Firm* — Kilpatrick Townsend & Stockton LLP

(57) ABSTRACT

Systems, methods, and computer-readable media for interactive video frame selection are described. One embodiment includes a method having the steps of causing a frame of a video to be displayed, receiving a selection of a point at a first location within the frame, and determining a particle in the frame associated with the point. The method further includes the steps of receiving a movement of the point to a second location, determining a second frame of the video comprising the particle based at least in part on a distance between the particle and the second location of the point in the second frame.

25 Claims, 6 Drawing Sheets

(56) References Cited

OTHER PUBLICATIONS

Sivic et al., "Video Data Mining Using Configurations of Viewpoint Invariant Regions", Proceeding of the 2004 IEEE Computer Society Conference on Computer Vision and Pattern Recognition (CVPR 04), 2004.

Sivic et al., "Video Google: A Text Retrieval Approach to Object Matching in Videos", Proceedings of the Ninth IEEE International Conference on Computer Vision (ICCV 2003), 2003.

Thanedar et al., "Semi-Automated Placement of Annotations in Videos", Dept. of Computer Science, University of California, Santa Barbara, 2004.

Yajima, C. et al., Querying Video Intervals by Spatio-temporal Relationships of Moving Object Traces, The Institute of Electronics, Information and Communication Engineers, Technical Report of IEICE, DE2001-100, 2001, pp. 167-174.

Aoki, S. et al., An Application of Motion Information for Picture Retrieval with MPEG-7, MPEG-7, 2001, pp. 29-36.

* cited by examiner

_US 8,588,583 B2_

SYSTEMS AND METHODS FOR INTERACTIVE VIDEO FRAME SELECTION

FIELD OF THE INVENTION

The present invention relates to video searching. The present invention more specifically relates to searching video footage for one or more frames.

BACKGROUND

Conventional video searching and editing typically involves searching through individual frames of a video sequence to find a specific frame or frames. For example, a video from a parking lot surveillance camera may record many hours of footage, but only frames showing a particular car leaving its parking space may be desirable. Using conventional editing techniques, a user may have to search sequentially through the entire video to find the time when the car leaves its parking space. Brute force searching of this nature can be time consuming and inefficient. Further, the desired footage may not exist within the video.

SUMMARY

Embodiments of the present invention comprise systems and methods for interactive video frame selection. For example, one embodiment of the present invention comprises a method comprising causing a frame of a video to be displayed, receiving a selection of a point at a first location within the frame, and determining a particle in the frame associated with the point. The method further comprises receiving a movement of the point to a second location, determining a second frame of the video comprising the particle based at least in part on a distance between the particle and the second location of the point in the second frame, and outputting an indication of the second frame of the video. In another embodiment, a computer-readable media comprises code for a carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
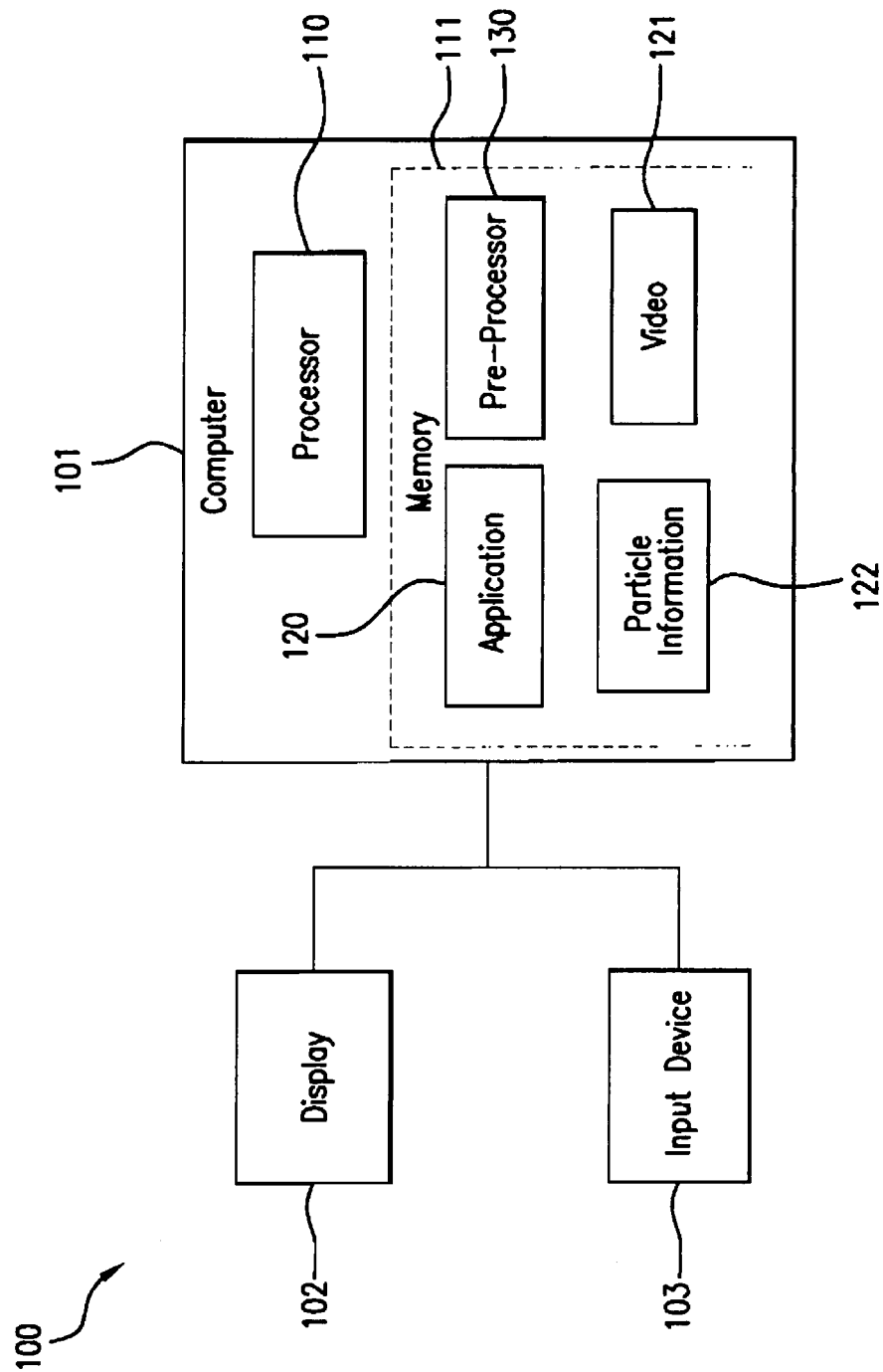
FIG. 1 shows a system for interactive video frame selection according to one embodiment of the present invention.

Embodiments of the present invention provide methods, systems, and products for interactive video frame selection. Methods, systems and products according to the present invention may be embodied in a number of ways. Certain embodiments of the present invention may, for example, reduce or eliminate inefficiencies in a video production editor's workflow. For example, one embodiment of the present invention may allow a user to view and edit the video itself, rather than manipulating an interface object and changing his focus to view the result, an inefficiency commonly referred to as "edit this, look at that" or ETLAT.

Illustrative Video Editing Tool

In one illustrative embodiment of the present invention, a computer system running computer software for editing video displays an editing window. Within the window, a frame of video is displayed. The video frame comprises one or more objects visible on screen. A user editing the video may desire to find a frame within the video having particular characteristics without having to manually search through the video. Using the illustrative embodiment of the present invention, the user may select a point of interest within a frame of the video. For example, the user may use a mouse to select the point. The user may then drag the point to a new location within the scene. The illustrative embodiment will then find a frame in the video in which the selected point has moved to the new location. For example, if the user has selected a point corresponding to an actor on the right side of the frame. The user then may drag the point to a new location on the left side of the frame, and the illustrative embodiment will find the frame in the video where the selected point on the actor is closest to newly-selected location on the left side of the frame. For example, in the video, the actor may have walked across the scene from right to left, and exited the left side of the frame. Once the illustrative embodiment finds the appropriate frame within the video, the system displays the frame that best corresponds to the user's desired location for the selected point.

Alternatively, there may not be a frame in the video in which the selected point moves to the new position the user has selected. For example, the actor may never appear on the left side of the screen. In such a case, the illustrative embodiment outputs the frame in which the actor is closest to the new position selected by the user. For example, the actor may only walk to the center of the scene, rather than all the way to the left edge. In such a case, the illustrative embodiment displays the frame in which the actor is nearest to the selected location at the left edge, such as when the actor is in the center of the screen.

Embodiments of the present invention may be used to quickly move forward and backwards through a video. For example, in one embodiment comprising a computer application, a user may select a point within a frame of the video and drag the point to a new location. As the user drags the point, the application may output frames corresponding to locations of the point. This may cause the video to quickly fast forward or rewind. For example, if the user selects a point on a parked car and drags the point away from the parking spot, the embodiment of the present invention may successively output frames of the video corresponding to the movement of the point. Thus, if a user is reviewing a lengthy surveillance video, the user may select a point on a car of interest, and drag the point to a location the user believes the car may pass through as it pulls out of the parking spot. The embodiment of the present invention will find and output the frame corresponding to the car leaving the parking spot. The user may then drag the point towards the exit of the parking lot, which may cause a perceived animation of the car driving away as the successive frames are found and output. This may allow the user to search through a lengthy surveillance video to find when a particular car pulls out of a spot without having to use conventional searching techniques, such as fast-forwarding through the video and watching for the car to leave.

Embodiments of the present invention may further be used to quickly find a frame to allow a video segment to be spliced into the video. If a desired location of an object is known, the user may simply select a point associated with the object in the video, and drag the point to the desired location. The desired frame is quickly located and the video segment may be easily inserted at the appropriate location in the video.

This example is given to introduce the reader to the general subject matter discussed herein. The invention is not limited to this example. Further details regarding various embodiments of products and methods for interactive video frame selection are described below.

Illustrative System

Referring now to the drawings in which like numerals refer to like elements throughout the several figures, FIG. 1 shows a system 100 for interactive video frame selection. System 100 comprises computer 101, display 102, and input device 103. Computer 101 comprises a processor 110 and a computer-readable medium, such as memory 111, and is in communication with the display device 102 and the input device 103. Memory 111 comprises an application 120 for interactive video frame selection, a pre-processor 130, video 121, and particle information 122. Processor 101 executes pre-processor 130 which analyzes the video 121, and generates particle information 122. Computer may then execute application 120, to edit the video 120.

In this illustrative embodiment, before the user edits the video with the application 120, the video 121 must be pre-processed. The pre-processor 130 analyzes the video 121, and generates particle information 122 which includes information relating to features and objects within the frames of the video. The pre-processor 130 stores the particle information 122 on a computer-readable medium for later use by the application 120.

A particle represents a portion of the video that is identifiable, distinct, and persists through one or more consecutive video frames. For example, a particle may be associated with a pixel within a bright area on an actor's arm. As the actor's arm moves, the associated bright area moves as well. A pre-processor analyzes the movement of the bright area, and changes the location of the particle over successive frames of the video so that the particle tracks the movement of the bright area. When the bright area is obscured, or moves out of the frame the associated particle is destroyed. If the bright area reappears at a later time, a new particle is created and associated with the bright area. It should be noted that when a particle is destroyed, it means that the particle no longer exists in later frames of the video, though it still persists in the earlier frames in which it was tracked. Instead a new particle will be created, even if the new particle is associated with the same feature in a new frame. In one embodiment, a particle only persists through consecutive frames in which the feature is visible. A more detailed description of particles may be found below.

As the pre-processor analyzes each frame of the video, it may create, update, or destroy one or more different particles. A frame of the video having a complicated scene may have many particles, each associated with a feature within the frame. As the features appear, move, and disappear, the pre-processor creates, moves, and destroys particles corresponding to the features. The pre-processor also stores the location of each particle for each frame of the video. Thus, for each particle that is created, its location is stored for each frame of the video in which it appears. The successive locations of the particle (i.e. the particle's movement) are referred to herein as its "track." The particle tracks stored as particle information 122 may be used by embodiments of the present invention to search through frames of the video to find a frame having the characteristics desired by the user.

Once the particle information is determined and stored, a user of system 100 may then use the application 120 to retrieve the video 121 and the particle information 122 from storage and load them into memory 111. The application 120 displays a first frame of the video 121 on display device 102. A user of the system 100 selects a point at a first location within the frame of the video 121. The user may then move the point to a different location. The application 120 receives the selection of the point at the first location from the input device 103, and determines a particle in the frame associated with the point. The application 120 further receives the movement of the point to the different location from the input device 103. The application 120 then determines a second frame in the video 121 having the particle associated with the point, based at least in part on a distance between the location of the particle in the second frame and the second location of the point selected by the user. Once the application 120 has determined the second frame, it outputs an indication of the second frame, such as by displaying the second frame, or by displaying a frame number of the second frame.

Note that the terms "first frame" and "second frame" used here and throughout this detailed description simply refer to arbitrary frames within the video, and not necessarily the first two frames of the video.

Figure 2:
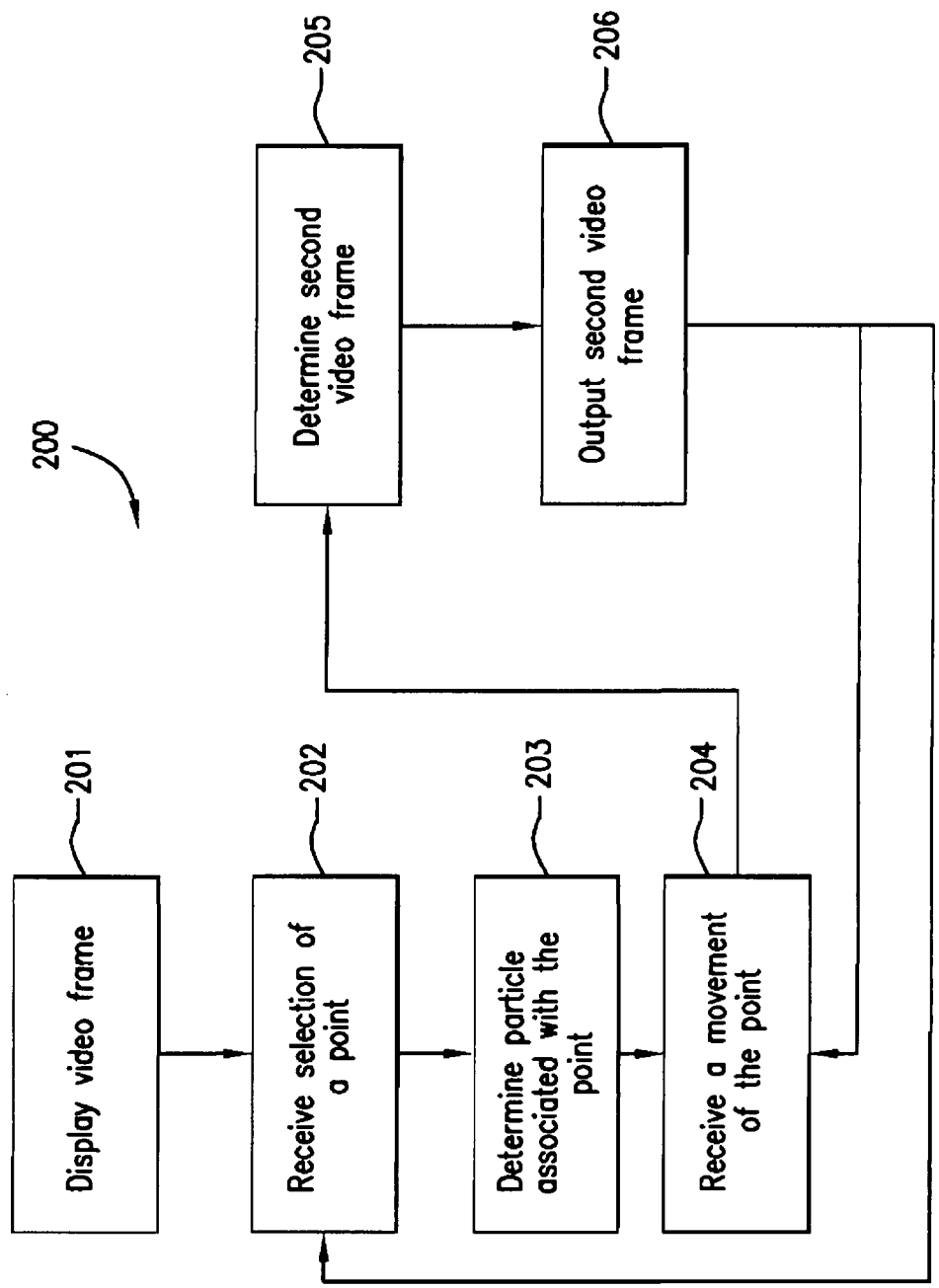
FIG. 2 shows a method for interactive video frame selection according to one embodiment of the present invention.

Further embodiments of the present invention will be described in more detail below with respect to FIGS. 2-6. FIG. 2 shows a method 200 for interactive video frame selection according to one embodiment of the present invention. The method 200 shown in FIG. 2 will be discussed with reference to the system 100 shown in FIG. 1. FIGS. 3-6 show views of first and second frames of a video 121.

The method 200 begins in block 201, where the system 100 displays a first frame of a video 121. For example, a user may execute a video editing application 120 on the computer 101 to display the first frame of the video on the display device 102. The video editing application 120 loads the video 121 from storage, such as from a computer-readable medium, into memory 111. The application 120 also loads particle information 122 from storage into memory 111. The particle information 122 has been previously generated by executing a pre-processor 130 to analyze the video 121. The computer 101 then displays the first frame of the video on the display device 102.

Figure 3:
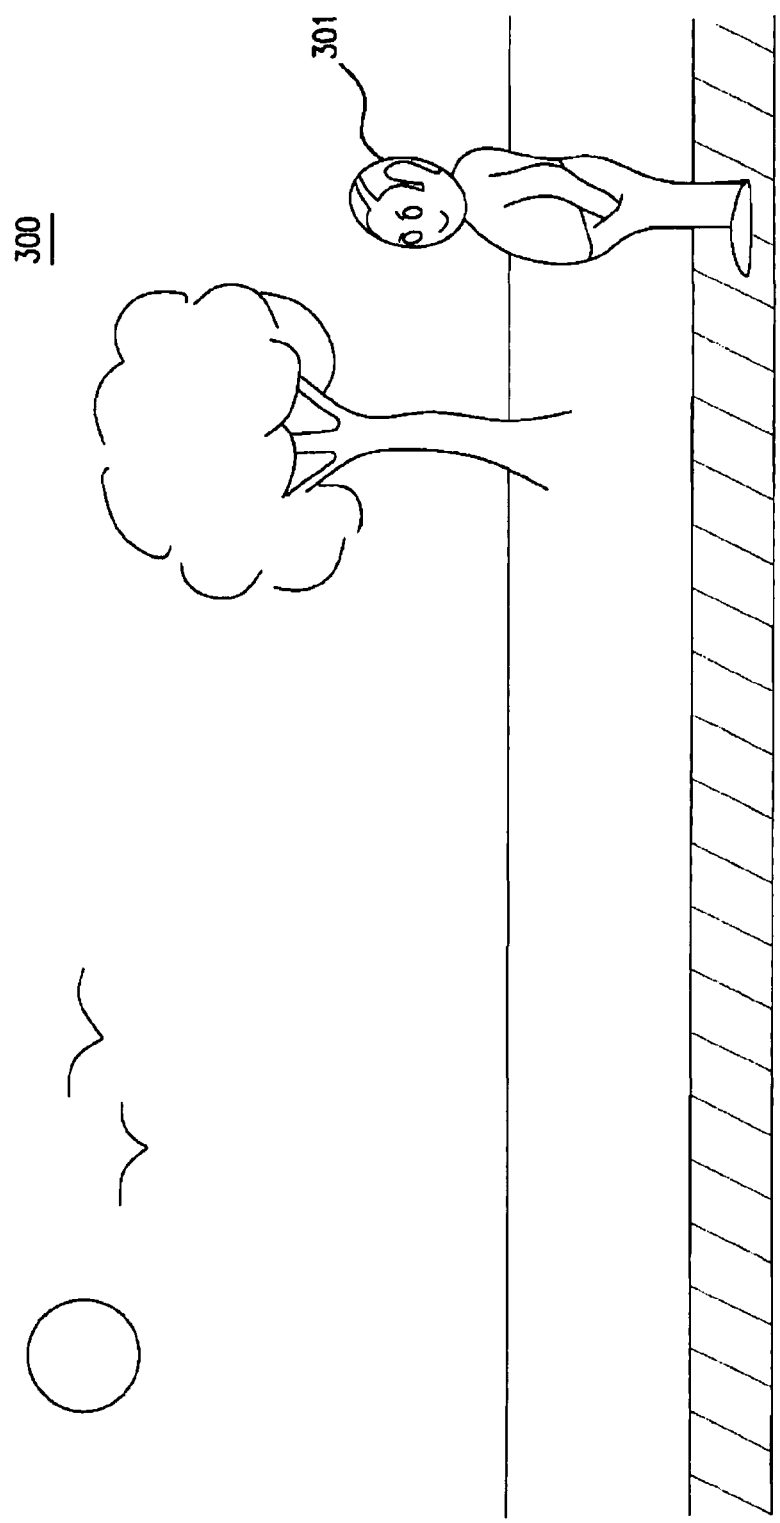
FIGS. 3-6 show views of first and second frames of a video.
Figure 4:
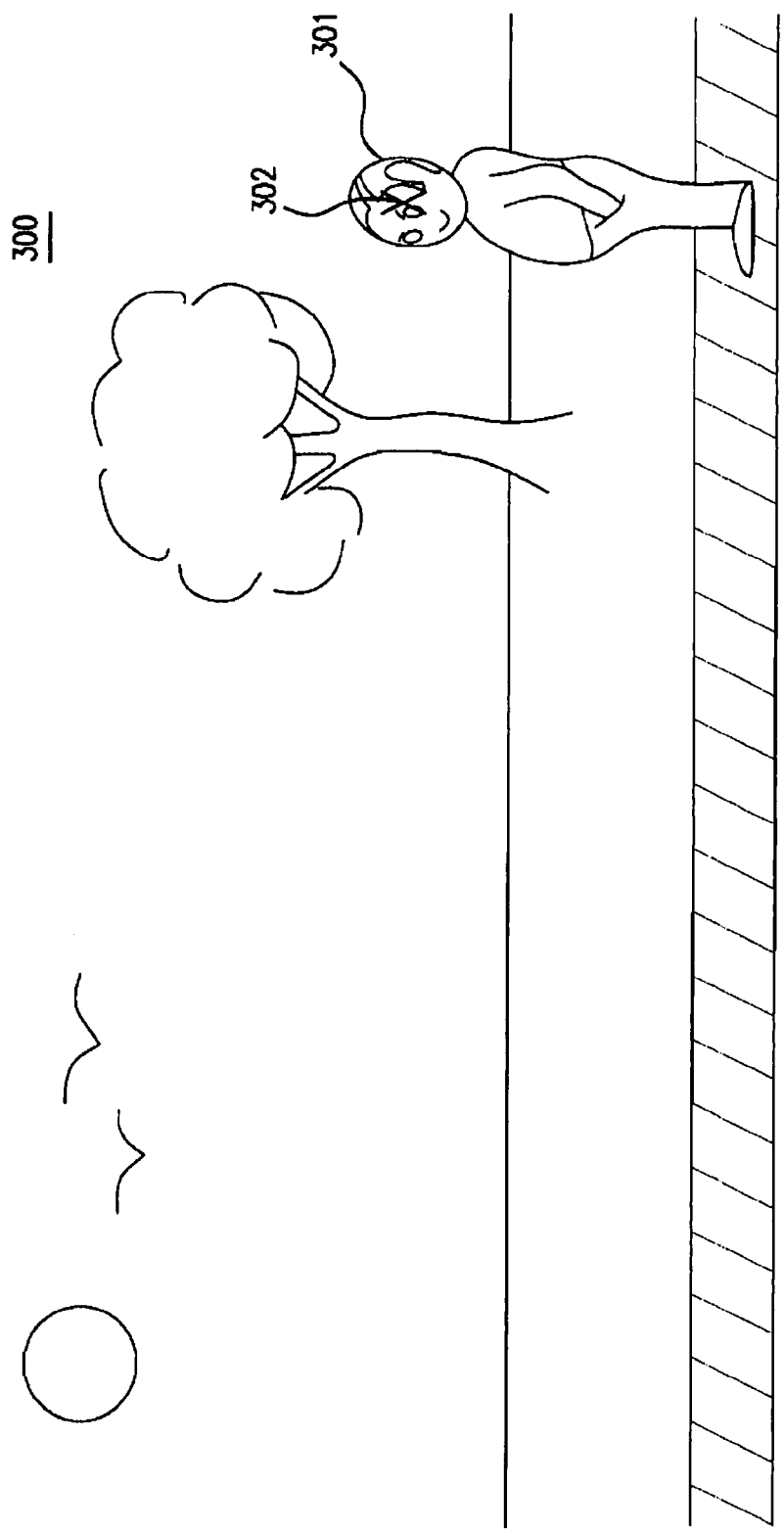

In the embodiment shown in FIG. 3, a first frame 300 of the video 121 is shown. The first frame 300 comprises an actor 301 as well as other elements, such as a tree, birds, and a sidewalk. In the embodiment shown in FIG. 3, the first frame is shown, but the particle information 122 is not displayed. The particle information 122 is generally used by the system 100 when executing the method 200, and is not generally useful to a user. Though in one embodiment, the particles within a frame may be displayed, or may optionally be displayed.

In block 202, the system 100 receives a selection of a point 302 at a first location within the first frame 300 of the video. Using system 100, a user may employ the input device 103, such as a mouse, touch screen, or other device, to select a point within the frame 300. For example, as may be seen in FIG. 4, a point 302 has been selected in the actor's 301 head. In the embodiment shown in FIG. 4, the point 302 selected by a user includes information associated with the point 302, such as its location, the frame number in which it was selected, and a target location. When the point is initially selected, the location of the point may be stored as Cartesian coordinates. The target location may be set to the same coordinates as the location of the point, or it may be set to a default value, such as an "undefined" value. The target location may later store the desired new location of the point.

In block 203, once the user has selected a point, the system 100 determines a particle in the frame associated with the point 302. Each frame within the video has zero or more particles associated with it. The particles, which are described more fully below, generally correspond to features or details within the frame and may change location over successive frames of the video. After the system 100 has received a selection of a point 302, the system 100 determines a particle within the frame 300 that is closest to the selected point 302. In the embodiment shown in FIG. 4, the closest particle to the selected point 302 overlaps the selected point 302. However, a user may select a point that does not overlap any particle. For example, in one embodiment, the particles within a frame are not displayed to the user. In such an embodiment, a user may not be aware of the particle locations, and may select an arbitrary point unassociated with a particle.

In a scenario in which a user selects a point that does not overlap with a particle, one embodiment of the present invention determines a particle closest to the point. For example, the embodiment calculates a Cartesian distance from the point to each of the particles within the frame, and select the particle closest the point. In another embodiment, the system calculates a squared-distance between the point and each of the particles within the frame by squaring the difference between the x-coordinates and y-coordinates of the particle and the point, and adding the difference together. The particle with the smallest squared-distance is selected as the nearest particle.

In the embodiment shown, the user has selected one point 302. However, in other embodiments, a user may select a plurality of points within the frame. For example, in one embodiment of the present invention, input device 103 may comprise a multi-touch input device, such as a multi-touch touch-screen, that allows a user to select multiple points simultaneously. In such an embodiment, each point selected within the frame may each be associated with a different particle. Alternatively, some of the selected points may be associated with the same particles. For example, if two selected points are closest to the same particle, the points may each be associated with the same particle.

In a scenario in which one or more selected point are not located at the same coordinate as the associated particle, the system may determine an offset associated with the distance between the point and the particle. In one embodiment, the offset is the distance between the point and the particle, and may be used by the system when searching for frames in the video, as will be described more fully below.

In block 204, the system 100 receives a movement of the point 302 to a second location 304. As may be seen in FIG. 5, the user has specified that point 302 has moved in the direction of arrow 303 to new location 304. Note that in one embodiment, arrow 303 in FIG. 5 indicates the movement of the point 302, but it is not actually displayed to the user.

To move point 302, a user of the system 100 may move a cursor to a new location 304 within the frame and click a mouse button to select the new location 304. In one embodiment, a user may click on the point and drag the point to a new location. In a further embodiment, a user may select a plurality of new locations or a region rather than a single location. Such an embodiment may allow a user to find multiple frames in which the selected point has moved to the selected locations.

Figure 5:
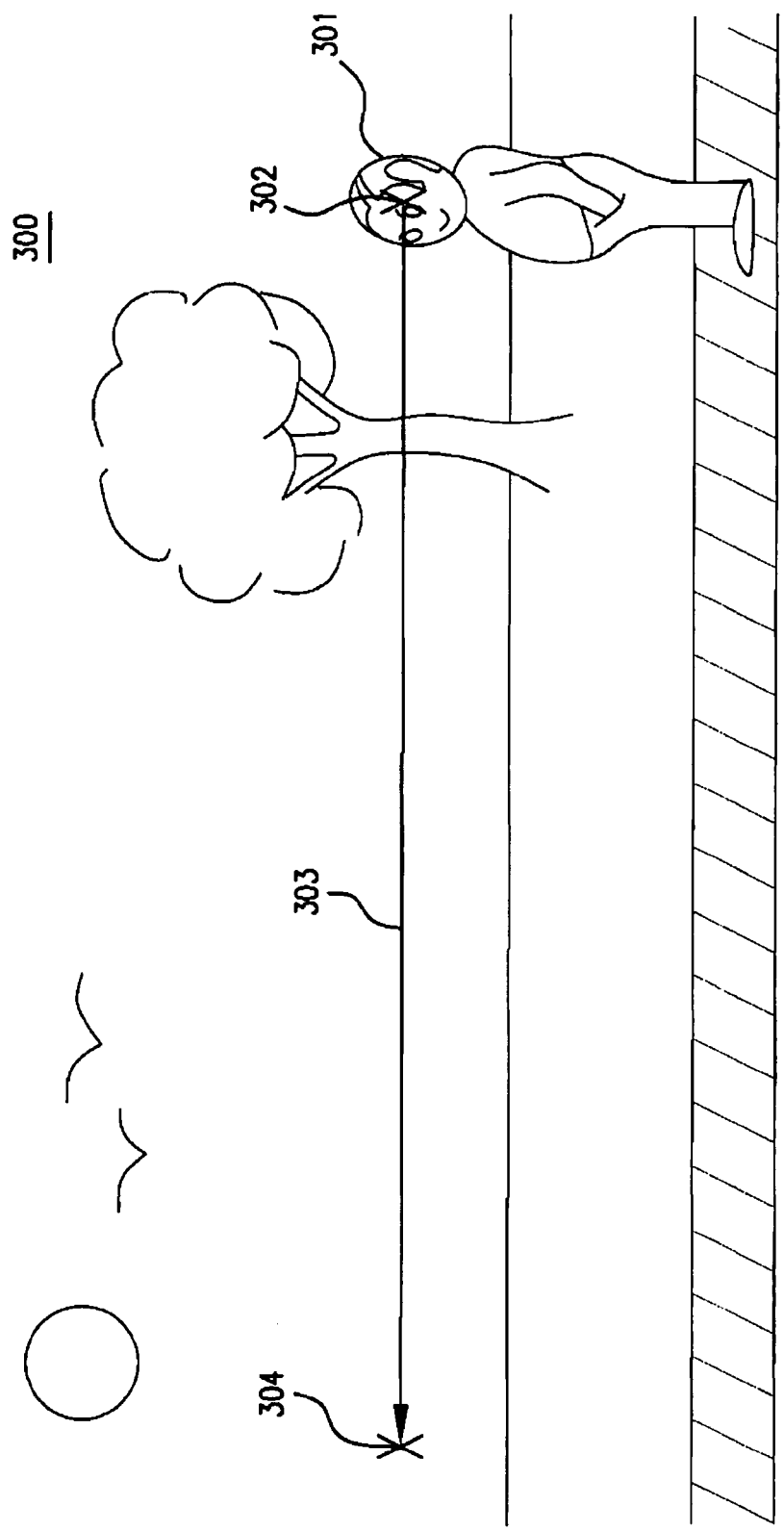

In the embodiment shown in FIG. 5, the movement to new position 304 is received as a single movement. However, in one embodiment, as the user drags point 302 to a new location, the system receives a plurality of movements of the point 302. In such an embodiment, the system 100 may perform method 200 for each received movement. Using such an embodiment, the system may display a succession of frames based on each detected movement of the point.

In an embodiment in which a user has selected a plurality of points, a user may elect, instead of moving each of the selected points, to move one or more of the points, while holding the remaining points in place. Such an embodiment may be useful when attempting to search for the relative movement of features within the frame. In such an embodiment, a user indicates that the target location for one of the points is its present location. For example, a user may be able to open a context-sensitive menu at the point and select an option to hold the point in place. In such a case, the movement received is an indication that the point is not to be moved.

In block 205, the system 100 determines a second frame of the video 121 comprising the particle based at least in part on a distance between the particle and the second location of the point 302 in the second frame. After receiving a movement of the point 302 to a second location 304, the system 100 searches the particle information for all of the frames having the particle associated with the point 302 to determine a set of candidate frames. For each of the candidate frames, the system 100 calculates the distance between the particle and the second location 304. The system then determines which of the candidate frames has the particle at a location closest to the point's 302 second location 304.

As was discussed earlier, an offset may have been calculated by the system 100 when it determined a particle closest to the selected point. In an embodiment in which an offset was determined based on the selected point and the closest particle, the distance between the particle and the second location may also include a correction for the offset value. For example, if the particle was ten units above the point at is original location, the second location may have a ten-unit offset added to it to correct for the initial distance between the selected point and the particle.

It should be noted that "closest" does not necessarily mean that the distance between the particle and the second location is zero. "Closest" means that distance between the particle's location and the second location in the second frame is the shortest distance between the particle and the second location for any frame in which the particle exists. Further, there may be more than one frame in which the particle is closest the second location. For example, if the video includes footage of a pendulum swinging, there may be a plurality of frames within the video in which the particle is closest to the second location. In such a case, one embodiment of the present invention arbitrarily selects one of the frames in which the particle is closest to the second location. In a further embodiment of the present invention, the system selects two or more frames in which the particle is closest to the second location. The embodiment may further allow the user to select one of the frames.

In one embodiment, the user may specify a maximum distance from the new location within which the particle must be located. The maximum distance may be used by a system to disregard frames in which the particle is farther from the second location than the maximum distance. In such an embodiment, it is possible for the system to determine that no frames within the video include a particle closest to the second location and within the maximum distance.

As mentioned previously, a system according to one embodiment of the present invention may allow a user to select and move a plurality of points within the frame. In such a case, the system first determines which frames of the video include all of the particles associated with the selected points. The system then determines a second frame of the video by calculating the least-squares distance between the locations of the particles associated with the plurality of points, and the new locations specified for the selected points. The system then determines the second frame by selecting the frame having the lowest least-squares distance between the particles and the new locations for the selected points.

In addition to the distance between the particle and the selected location, other factors may be used as well to determine the best second frame of the video to select. For example, in one embodiment of the present invention, a weighting factor may be incorporated into the determination based on when the second frame occurs relative to the first frame. For example, it may be desirable for the second frame to be a frame that occurs after the first frame of the video. In such a case, the user may configure the embodiment to only search for frames occurring after the first frame. Alternatively, the user may specify that frames having frame numbers close to the first frame may be more desirable. In such an embodiment, the system may select a second frame that occurs ten frames before the first frame rather than a frame that occurs 500 frames after the first frame. Still other weighting factors may be incorporated.

For example, some embodiments discussed above relied exclusively on the physical distance between the particle and the second location of the selected point to determine the second frame. However, in an embodiment in which the determination is made based on other variables, such as frame numbers or time sequences, the physical distance may be given a weighting factor as well. For example, one embodiment of the present invention may multiply the value of each of the variables by their weighting factors, and add the values together to determine a score for each candidate frame. The candidate frame having the highest score may be selected. In such a case, a best frame may be selected in which the particle is not closest to the new location of the selected point. Still further embodiments would be apparent to one of ordinary skill in the art.

Figure 6:
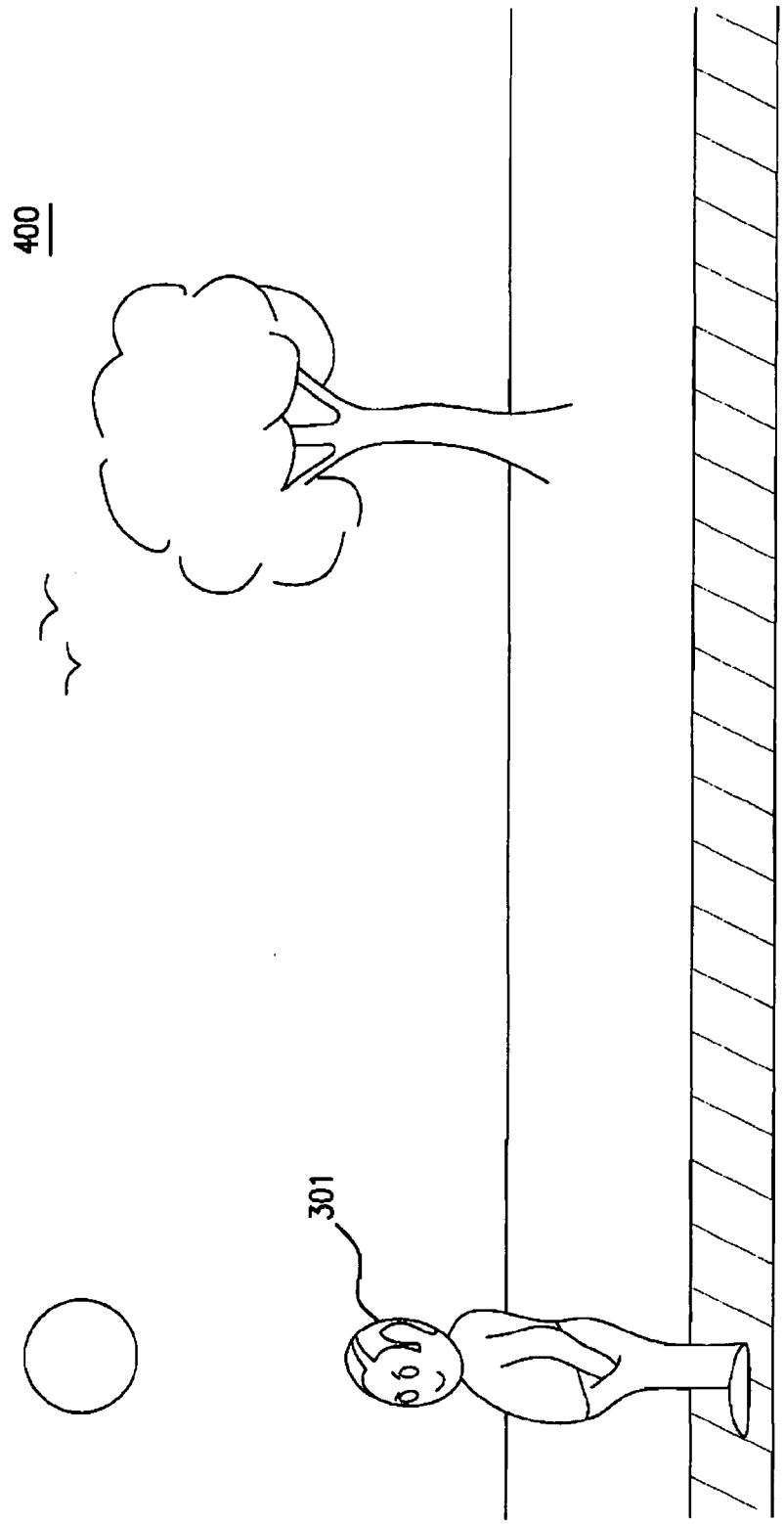

In block 206, after the system 100 has determined the second frame 400, the system 100 outputs an indication of the second frame 400 of the video. FIG. 6 shows the second frame 400 of the video output by system 100 in which the particle is closest to the second location 304 of the point 302. In the embodiment shown in FIG. 6, system 101 displays the second frame 400 of the video for the user to view. In one embodiment, a system may output an indication of the second frame 400 of the video by outputting a frame number of the second frame 400. In a further embodiment, a system may output a plurality of frame numbers corresponding to frames having the particle closest to the second location. In one embodiment, a system may output a thumbnail of the second frame 400.

Once the system 100 has output an indication of the second frame 400 of the video, the system 100 may return to other blocks within the method 200. For example, the system 100 may return to block 204 to receive a second movement of the point to a new location and proceed through the remaining steps of the algorithm. Further, the system 100 may return to block 202 to receive a selection of a second point.

Additional embodiments of the present invention may not incorporate particle information, but may include other information that identifies features within a video. For example, in one embodiment, a system includes information about objects within the video, rather than particles. For example, the video may be pre-processed and virtual objects may be associated with features or visual elements within the video. For example, an object may be created and associated with an actor. The object may then be used each time the actor appears within a frame of the video, even if those frames are not consecutive. For example, an actor may appear in a scene early in the video. He may not appear in a scene in the middle of the video, and may re-appear again in a scene at the end of the video. The system may associate the same object with the actor in the first scene as well as the last scene of the video, even though the actor was not within any frames in the middle of the video. Further, other methods for tracking portions of a video may be employed within embodiment of the present invention. For example template tracking may be used in which a one or more well-defined templates may be used to track specific objects within a video. For example, a template tracking system capable of identifying cars may be used to identify and track the location of cars within the video. The tracking information may then be used by an embodiment of the present invention, rather than the particle information.

Returning to embodiments of the present invention that employ particle information, as was described above, particles are determined by a preprocessor and represent points within one or more frames of a video.

To begin, a preprocessor computes an optical flow field on pairs of consecutive frames using an energy function that includes a smoothness term modulated by the image gradient magnitude, and an occlusion factor, which is used to indicate occluding boundaries, based on the divergence of the optical flow field and pixel projection differences. Bilateral filtering is then applied near occluding boundaries to improve boundary sharpness. Next, particles identified in a first frame are propagated to subsequent frames using an optimization process that considers the optical flow field, image intensity, color channels, and a weighted smoothness term with respect to nearby particles. After particles are propagated, for each frame, particles with high post-optimization error are pruned, and new particles are added in gaps between existing particles. For example, if a particle is pruned from an area within a frame, one or more particles may be added to the area to increase the particle density. This analysis is performed on the video in both the forward time direction (from the first frame to the last frame), as well as in reverse (from the last frame to the first frame) to provide more accurate particle track information.

A particular embodiment of an algorithm for preprocessing a video is described above may be found in "Particle Video: Long-Range Motion Estimation using Point Trajectories" by Peter Sand and Seth Teller, MIT Computer Science and Artificial Intelligence Laboratory, IEEE Conference on Computer Vision and Pattern Recognition, 2006 ("Sand"), the entirety of which is hereby incorporated by reference.

An advantage of the particle video approach is that it is both spatially dense and temporally long-range. In contrast, other methods tend to be long-range but spatially sparse, or spatially dense but temporally short-range. Thus, particle video data is well-suited for searching through video to find a selected frame, as we can estimate the motion of arbitrarily selected pixels through frames of the video by finding a nearby particle.

Referring again to FIG. 1, embodiments of the present invention can be implemented in digital electronic circuitry, or in computer hardware, firmware, software, or in combinations of them. In one embodiment, a computer 101 may comprise a processor 110 or processors. The processor 110 comprises a computer-readable medium, such as a random access memory (RAM) coupled to the processor. The processor 110 executes computer-executable program instructions stored in memory 111, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other forms of computer-readable media may transmit or carry instructions to a computer, such as a router, private or public network, or other transmission device or channel. The processor, and the processing, described may be in one or more structures, and may be dispersed through one or more structures. The processor may comprise code for carrying out one or more of the methods (or parts of methods) described herein.

General

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

That which is claimed is:

1. A method, comprising:
receiving, by one or more electronic processors in communication with a non-transitory computer-readable medium, a frame of a video;
receiving, by one of the one or more electronic processors, a selection of a point at a first location within the frame;
determining, by one of the one or more electronic processors, a particle in the frame associated with the point;
receiving, by one of the one or more electronic processors, a movement of the point to a second location;
determining, by one of the one or more electronic processors, a second frame of the video comprising the particle based at least in part on a distance between the particle and the second location of the point in the second frame; and
outputting, by one of the one or more electronic processors, an indication of the second frame of the video.

2. The method of claim 1, wherein outputting the indication of the second frame of the video comprises displaying the second frame.

3. The method of claim 1, wherein outputting the indication of the second frame of the video comprises displaying a frame number of the second frame.

4. The method of claim 1, further comprising receiving, by one of the one or more electronic processors, a variable defining a temporal weighting, and wherein determining the second frame of the video comprising the particle further comprises determining the second frame of the video based at least in part on the temporal weighting.

5. The method of claim 4, wherein the temporal weighting decreases as a time between the first frame and a candidate frame increases.

6. The method of claim 1, further comprising receiving, by one of the one or more electronic processors, a maximum distance, and wherein determining the second frame of the video comprising the particle further comprises determining, by one of the one or more electronic processors, the second frame of the video based at least in part on the maximum distance.

7. The method of claim 6, wherein determining a second frame of the video comprises eliminating frames of the video in which the particle has a distance from the second location greater than the maximum distance.

8. The method of claim 1, further comprising pre-processing the video, by one of the one or more electronic processors, to determine one or more particles within one or more frames of the video.

9. The method of claim 1, wherein receiving a first point at a first location further comprises receiving a plurality of points at a plurality of locations.

10. The method of claim 9, wherein determining a particle in the frame associated with the point comprises determining a plurality of particles in the frame associated with the plurality of points.

11. The method of claim 10, wherein receiving a movement of the point to a second location comprises receiving a movement of at least one of the plurality of the points to a new location.

12. The method of claim 11, wherein determining the second frame of the video comprises determining a least-squares distance between the plurality of points and the plurality of associated particles.

13. A non-transitory computer-readable medium on which is encoded program code configured to be executed by an electronic processor, the program code comprising:
program code configured to cause the electronic processor to receive a frame of a video;
program code configured to cause the electronic processor to receive a selection of a point at a first location within the frame;
program code configured to cause the electronic processor to determine a particle in the frame associated with the point;
program code configured to cause the electronic processor to receive a movement of the point to a second location;
program code configured to cause the electronic processor to determine a second frame of the video comprising the particle based at least in part on a distance between the particle and the second location of the point in the second frame; and
program code configured to cause the electronic processor to output an indication of the second frame of the video.

14. The non-transitory computer-readable medium of claim 13, further comprising program code configured to cause the electronic processor to receive a variable defining a temporal weighting, and wherein the program code configured to cause the electronic processor to determine the second frame of the video comprising the particle further comprises program code configured to cause the electronic processor to determine the second frame of the video based at least in part on the temporal weighting.

15. The non-transitory computer-readable medium of claim 13, further comprising program code configured to cause the electronic processor to receive a maximum distance, and wherein the program code configured to cause the electronic processor to determine the second frame of the video comprising the particle further comprises program code configured to cause the electronic processor to determine the second frame of the video based at least in part on the maximum distance.

16. The non-transitory computer-readable medium of claim 13, further comprising program code configured to cause the electronic processor to pre-process the video to determine one or more particles within one or more frames of the video.

17. The non-transitory computer-readable medium of claim 13, wherein the program code configured to cause the electronic processor to receive a first point at a first location further comprises program code configured to cause the electronic processor to receive a plurality of points at a plurality of locations.

18. The non-transitory computer-readable medium of claim 17, wherein the program code configured to cause the electronic processor to determine a particle in the frame associated with the point comprises program code configured to cause the electronic processor to determine a plurality of particles in the frame associated with the plurality of points.

19. The non-transitory computer-readable medium of claim 18, wherein the program code configured to cause the electronic processor to receive a movement of the point to a second location comprises program code configured to cause the electronic processor to receive a movement of at least one of the plurality of the points to a new location.

20. The non-transitory computer-readable medium of claim 19, wherein the program code configured to cause the electronic processor to determine the second frame of the video comprises program code configured to cause the electronic processor to determine a least-squares distance between the plurality of points and the plurality of associated particles.

21. A system, comprising:
a non-transitory computer-readable medium; and
an electronic processor in communication with the computer-readable medium, the non-transitory computer-readable medium comprising program code, the processor configured to execute the program code to cause the electronic processor to:
receive a frame of a video;
receive a selection of a point at a first location within the frame;
determine a particle in the frame associated with the point;
receive a movement of the point to a second location;
determine a second frame of the video comprising the particle based at least in part on a distance between the particle and the second location of the point in the second frame; and
outputting an indication of the second frame of the video.

22. The system of claim 21, wherein the electronic processor is further configured to receive a plurality of points at a plurality of locations.

23. The system of claim 22, wherein the electronic processor is further configured to determine a plurality of particles in the frame associated with the plurality of points.

24. The system of claim 23, wherein the electronic processor is further configured to receive a movement of at least one of the plurality of the points to a new location.

25. The system of claim 24, wherein the electronic processor is further configured to determine a least-squares distance between the plurality of points and the plurality of associated particles.

* * * * *